United States Patent [19]

Davis

[11] Patent Number: 4,971,237

[45] Date of Patent: Nov. 20, 1990

[54] ROTATABLE SPARE TIRE HOLDING APPARATUS

[76] Inventor: Darrel B. Davis, 170 Macleay Rd., Sequim, Wash. 98382

[21] Appl. No.: 286,703

[22] Filed: Dec. 20, 1988

[51] Int. Cl.⁵ .............................................. B62D 43/02
[52] U.S. Cl. ................................ 224/42.06; 224/282; 224/42.21; 224/42.07; 414/462; 211/20; 296/37.2
[58] Field of Search ................. 224/282, 42.06, 42.07, 224/42.08, 42.12, 42.21, 42.24, 42.26, 42.27, 42.48; 211/23, 24, 20, 21, 22; 296/37.2; 414/462, 463

[56] References Cited

U.S. PATENT DOCUMENTS

| | | | |
|---|---|---|---|
| 1,597,693 | 8/1926 | Ragsdale | 224/42.24 |
| 3,387,754 | 6/1968 | Sinkey et al. | 224/42.21 |
| 3,448,904 | 6/1969 | Sahr | 224/42.21 |
| 3,613,971 | 10/1971 | Betz | 224/42.06 X |
| 4,327,848 | 5/1982 | Weiler | 224/42.06 |
| 4,418,851 | 12/1983 | Ankeny | 224/42.06 |
| 4,483,468 | 11/1984 | Lucas | 224/42.06 |
| 4,561,575 | 12/1985 | Jones | 224/42.21 |

*Primary Examiner*—Ernest G. Cusick
*Attorney, Agent, or Firm*—William I. Beach

[57] ABSTRACT

A spare tire holding apparatus has an arch-like frame and an attached bracket for supporting a tire and wheel thereon. The frame extremities are rotatably mounted on one end of a pair of couplings which in turn have the opposite ends connected to spaced extensions of the end of a body frame of an automotive vehicle.

9 Claims, 4 Drawing Sheets

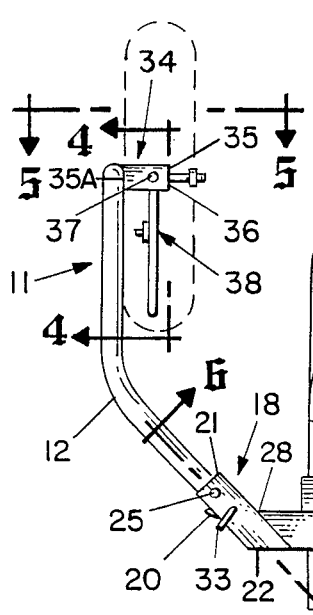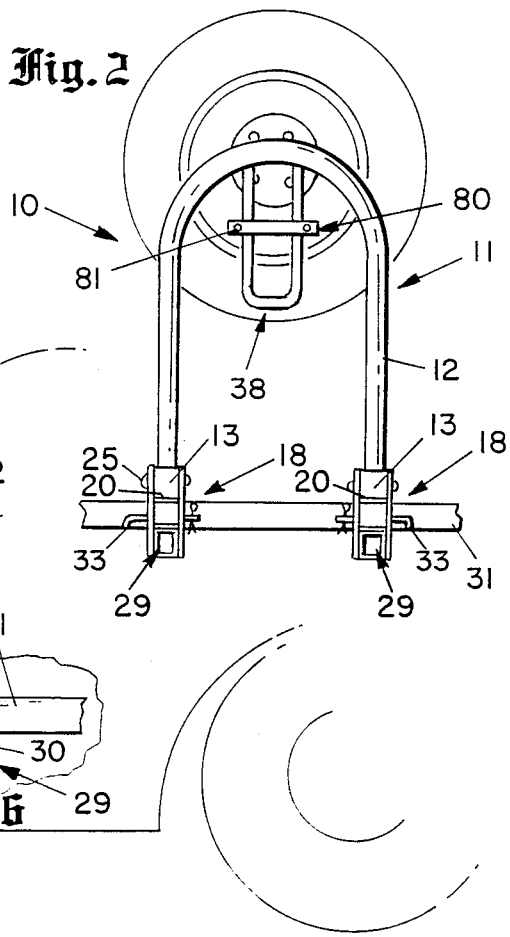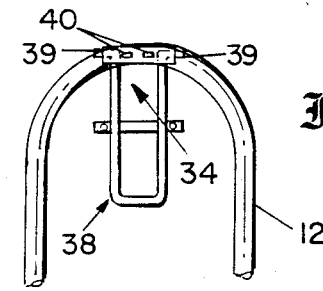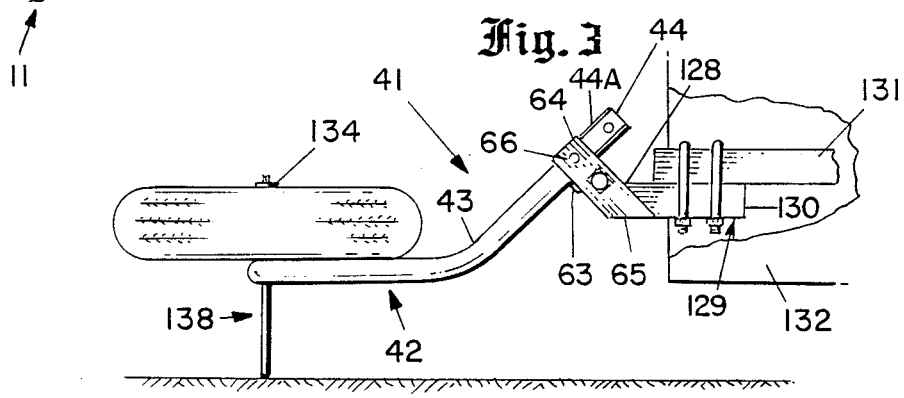

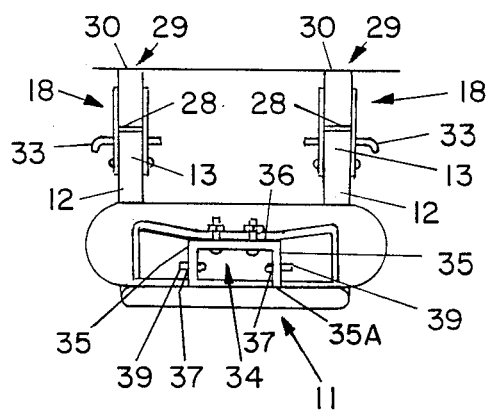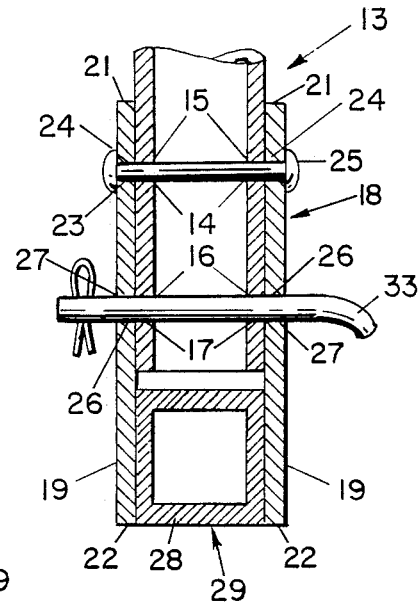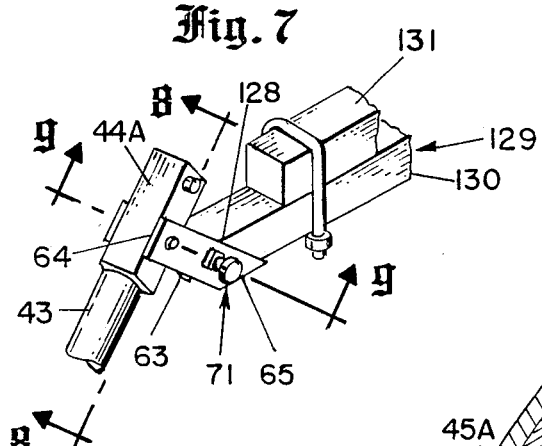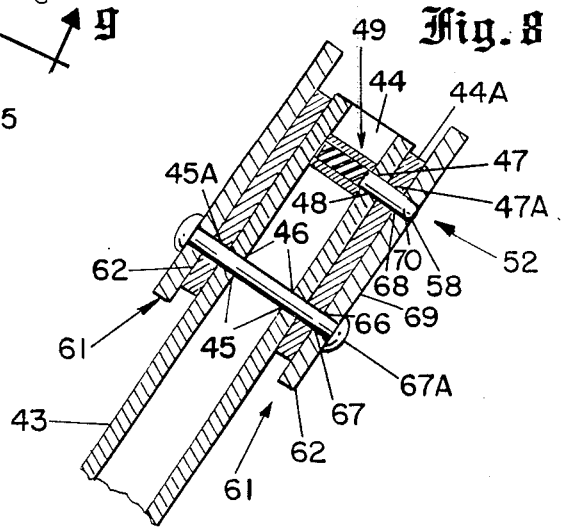

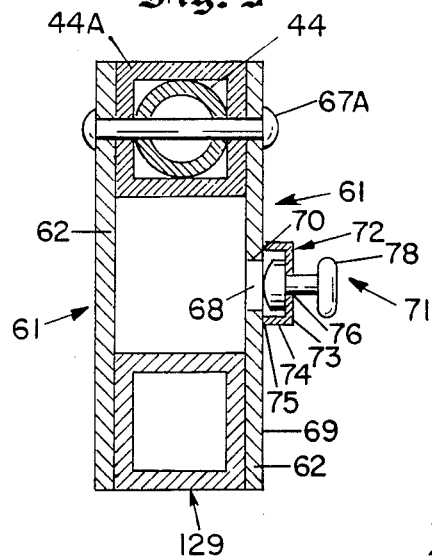
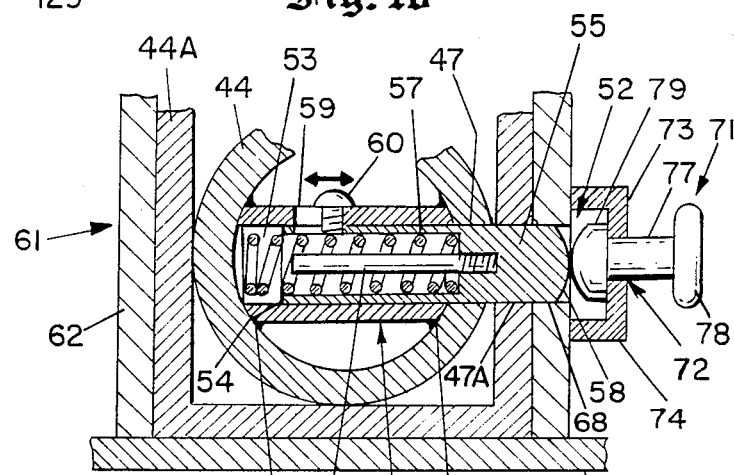
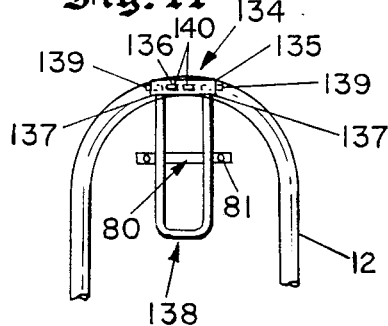

ROTATABLE SPARE TIRE HOLDING APPARATUS

BACKGROUND OF THE INVENTION

1. Field of the Invention

The present invention relates to apparatus for holding spare tires and especially the type for mounting on automotive equipment and more particularly rotating apparatus that can be lowered from an upright to a horizontal position for mounting a tire and wheel on the holding apparatus. More importantly yet, an apparatus that supports a tire on the side facing the vehicle such that when lowered to a horizontal position the tire faces upward.

2. Description of the Prior Art

With most of the spare tire holding apparatus attached to pickup trucks, vans and the like the spare tire is mounted on the holder facing away from the vehicle on which it is attached. Subsequently, if lowered to a horizontal position the tire is placed underneath the holder and near the ground. A tire in that position is very difficult to remove or to put on the spare tire holder. It is further obvious that a mounted wheal is very bulky and heavy. Most women drivers and particularly the elderly drivers would probably require assistance to remove or put a tire mounted wheel on an upright holding apparatus. Several patents disclosed in a novelty search showed various arrangements for connecting a tire holding apparatus to the bumper or body frame of a pick-up truck. Most appeared somewhat complicated and expensive to use. Furthermore, none mounted the spare tire on the apparatus in such a manner that it lay on the top side of the holding apparatus when placed in a horizontal position close to and above the ground. In light of the above it is the object of the present invention to provide a spare tire holder that supports the spare tire on the top side of the holder when in a horizontal ground supported position. The apparatus of the present invention can be manufactured inexpensively, is easy to install on a pickup truck or a van and provides simple and ready means to removably mount a heavy tire and wheel on a horizontal positioned platform.

SUMMARY OF THE INVENTION

In carrying the principles of the present invention in accordance with a preferred embodiment thereof a spare tire holding apparatus comprises an assemblage of supporting elements for holding a tire and wheel thereon. The tire holder has an arch-like frame with spaced extremities extending rearward and downward to a pair of left and right distal ends. The pair of distal ends have a first hole bored therethrough for a first hinge connection. There is a second hole bored through the distal ends for a first lock connection. Rotatably connected to the pair of distal ends is a pair of spaced left and right couplings. The couplings comprise a pair of upright plates which have a third hole extending through the front end for a second hinge connection. Enclosed in the third hole and first hole is a hinge pin for rotating the first hinge connection about the second hinge connection. The upright plates of each coupling has an open top and an open bottom except for rib member secured to the bottom edges of each pair of plates intermediate of the front and rear ends. At the rear end of each coupling is a fourth hole that extends through both plates of each pair of the couplings for a second lock connection. Included is a fastening member adapted to engage the second and first lock connections and fasten both together firmly within the couplings to support the frame in an upright position. The rear ends of the couplings extend downward and inward to a rigid connection with the outer ends of a pair of spaced left and right extensions. The extensions in turn are relatively short and have inner ends secured to an end of a automotive body frame. Further included adjacent to the crest of the spare tire frame is a U-shaped attachment bracket. The bracket has a pair of spaced side members with inner ends connected to the opposite ends of a cross member. There are two spaced holes in the corss member for fastening the spare tire and wheel on the bracket. The outer ends of the bracket side member are fixedly secured at right angle to the crest portion of the frame. A hole extends through the side side members adjacent to the frame in which are loosely hung the opposite right angle ends of an Omega-shaped stand. When the frame is lowered downward the fastening member is withdrawn from the second and first holes and the stand swings outwardly and downwardly to provide horizontal support above the ground. In this position the spare tire and wheel lay on the top of the frame and can be removed or replaced on the frame with minimum effort.

BRIEF DESCRIPTION OF THE DRAWING

FIG. 1 is a side elevated view of a spare tire holding apparatus of the present invention, FIG. 2 is a front elevated view of FIG. 1, FIG. 3 is a side elevated view a modified form of the figure in FIG. 1, FIG. 4 is a rear elevated view partly in section taken along 4—4 of FIG. 1, FIG. 5 is a plan view of the holder with the spare tire taken along line 5—5 of FIG. 2, FIG. 6 is an elevated sectional view of the connection of the frame to the couplings taken long line 6—6 of FIG. 1, FIG. 7 is a prospective sectional view of the frame to the couplings shown of the modified form in FIG. 3, FIG. 8 is an elevated sectional view taken along line 8—8 of FIG. 7, FIG. 9 is an elevated sectional view taken along line 9—9 of FIG. 7, FIG. 10 is a side view of a lock mechanism shown in FIGS. 8 and 9, FIG. 11 is a rear elevational sectional view of FIG. 3.

DETAILED DESCRIPTION OF THE PRESENT INVENTION

Figure 12:
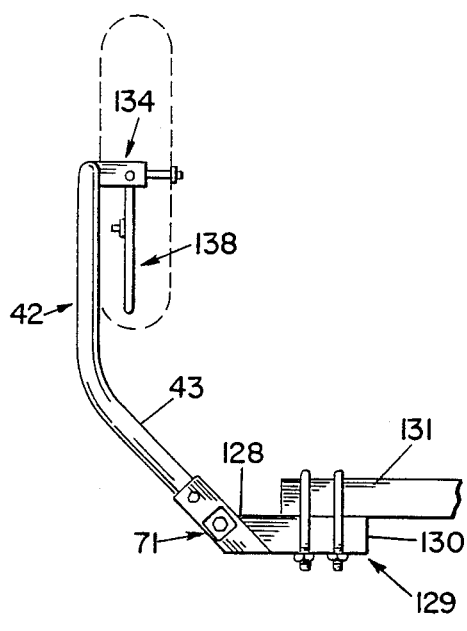
FIG. 12 is a modified form of FIG. 1 showing a front view of the push button assembly.

Referring to FIG. 1 the spare tire holder 10 is shown in an upright position. As shown in FIG. 2 it can be seen that the frame 11 is arch-like in appearance and attached to the body frame of an automotive vehicle. The spare tire frame is a metal tubular structure with spaced arcuate left and right extremities 12. The extremities have a straight upright portion for holding a spare tire thereon and bends downward and rearward to left and right distal ends 13. The distal ends 13 of the extremities are bored through with a first hole 14 for a first hinge connection 15 and a second hole 16 for a first lock connection 17. Rotatably connected to the distal ends are a pair of couplings 18 consisting of two spaced upright plates 19. The plates have an open channel at the top portion and a rib 20 attached across the bottom edges. The rib 20 is positioned intermediate of the front end 21 and the rear end 22 of the couplings. At the front end 21 is a third hole 23 extending through both pair of couplings plates for a second hinge connection 24 including a hinge pin 25 for rotating the first hinge connection 15 of the distal ends 13 about the second hinge connection 24. A fourth hole 26 extends through plates 19 at the rear end 22 of couplings 18. The hole 26 is arranged for a second lock connection 27. Lock connection 27 is adapted to mesh with the first lock connection 17 for locking the pair of distal ends of frame 11 within the couplings 18. The rear ends 22 of the couplings are secured to the outer ends 28 of a pair of extensions 29. The extensions in turn have spaced inner ends 30 secured to the end of a body frame 31 of an automotive vehicle 32. Accordingly when spare tire frame is raised to an upright position the first hinge connections 15 of distal ends 13 are rotated about the second hinge connections 24. Subsequently, the first lock connections 17 of the distal ends are rotated downward between plates 19 of couplings 18 to rest on ribs 20. The first and second lock connections are then fastened together side by side, with fastening member 33 inserted in the fourth hole 26 in couplings 18 and on through hole 16 in distal ends 13. The fastening member 33 consists of a rod with one curved for a handle and the other end pierced for a cotter pin.

The means for mounting the spare tire on frame 11 is shown in FIG. 3, 4 and 5. A U-shaped bracket 34 is fastened at right angle to the crest portion of the spare tire frame. The bracket 34 has a pair of side members 35 connected at the inner ends to the ends of a cross member 36. The outer ends 33A of the side flanges are rigidly secured at right angle to spaced side portions at the crest of the spare tire frame 11. A hole 37 extends through the side members adjacent to their outer end connection to the spare tire frame. Suspended freely from the side member is channel-like stand 38 with right angle ends 39 rotatably mounted in the holes 37. Preferably a pair of elongated openings 40 extends through the cross member 36 in which typical bolt and nut fasteners are used to attach the rim of a spare tire to the bracket 36. In that connection, the mounting of or removal of the spare tire can be done more effectively and efficiently when the frame is lowered to a ground supported horizontal position. This is readily done by removing fastening member 33 from the first and second lock connections 17 and 27 and lowering the frame whereupon the channel-like stand 38 swings out and down to the ground to provide support for frame 11, reference FIG. 3.

Figure 13:
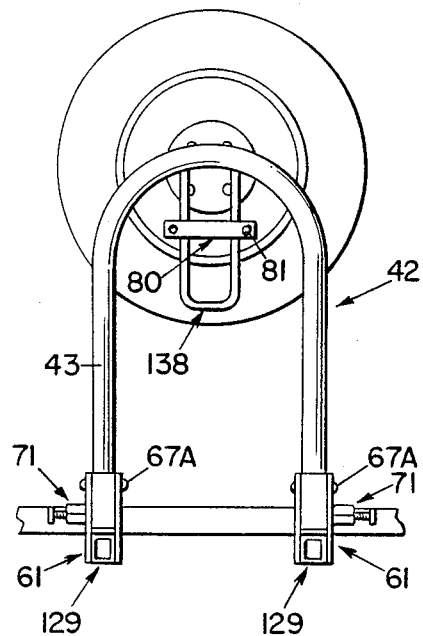
FIG. 13 is modified form of FIG. 1 showing a side view of the push button assembly.
Figure 14:
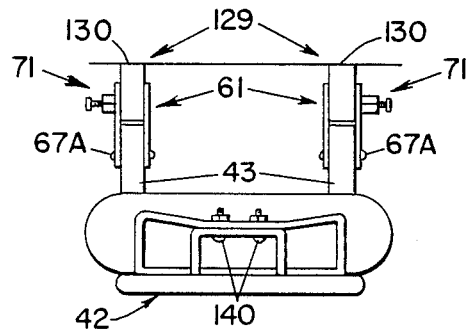
FIG. 14 is a modified form of FIG 5 showing a plan view of the push button assembly.
Figure 15:
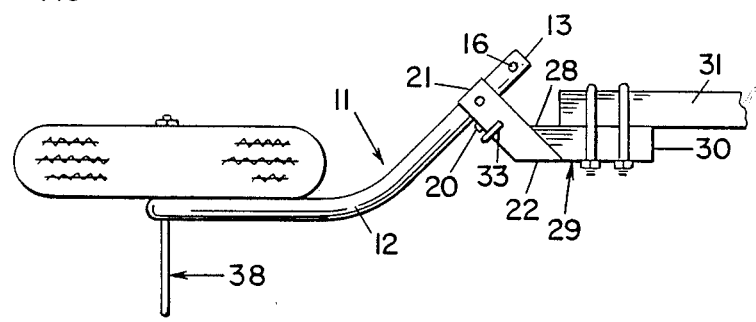
FIG. 15 is a side view of FIG. 1 showing the frame lowered to a horizontal position.

A modified form of the present invention is illustrated in FIGS. 3 and 7-14 wherein the first and second lock connections are releasably fastened together by more preferred locking means described below. Further in the embodiment of FIG. 3 the elements that are functionally equivalent to elements previously described for FIG. 1 are designated by similar reference numbers each with the prefix 1 added thereto. Therefore referring to FIG. 3, the spare tire holding apparatus 41 also includes an arch-like tubular metal frame 42 with spaced arcuate formed extremities 43 extending downward and rearward to lineal distal ends 44. A first hole 45 extends through the distal ends 44 for a first hinge connection 46. A second hole 47 spaced from the first hole extends through one side of distal ends 44 for a first quick release lock connection 48. Covering distal ends 44 is a square tubular enclosure 44A including a hole 45A aligned with first hole 45 and another hole 47A aligned with second hole 47.

A short tubular body 49 is secured inside of the distal ends 44 wherein the front and rear ends 50 and 51 are transversely secured to the interior wall of the body 49 in alignment with second hole 47 through a side wall of distal ends 44. Slidably enclosed in body 49 is a lock pin 52 which has a central bore 53 extending from a rear end 54 of the lock pin to the head portion 55 of the lock pin. A rod 56 is concentrically mounted inside of the bore 53 in which the front end is threadedly inserted in the interior face of the head portion 55. Surrounding the rod 56 is a compression spring 57. The spring extends from the rear end 51 of body 49 to the head portion 55 adapted to force the top 58 of lock pin 52 out of the second hole 47 of the distal ends 44 and adjacent hole 47A of enclosure 44A. Further in the top wall of tubular body 49 is an elongated opening 59 for regulating the travel of the lock pin tip 58 in and out of holes 47 and 47A. A screw 60 adapted to slide in opening 59 with movement of the lock pin is threadedly engaged in the top wall of lock pin 52. When the lock pin tip extends out of said holes the screw 60 is stopped against the front end of opening 59. When tip 58 is pressed back in body 49 the screw 60 is stopped against the rear end of opening 59.

Adjoining distal ends 44 are a pair of left and right couplings 61. Each coupling has two upright plates 62 spaced apart by a rib 63 connected to each pair of plates at the bottom edges. Rib 63 is positioned intermediate of the front end 64 and rear end 65 of the couplings. A third hole 66 extends through both plates of each coupling adjacent to the front end 64 for a second hinge connection 67. A hinge pin 67A inserted through the third hole 66 and first hole 45 and 45A in distal ends 44 and enclosures 44A is adapted to rotate the first hinge connection 46 about the second hinge connection 67. Adjacent to the rear end 65 of the couplings is a fourth hole 68 for a second lock connection 70 which extends through an outside plate 69 of each pair of couplings. The fourth hole 68 provides translation means for the second quick release lock connection 70 operating together with the first quick release lock connection 48 for locking distal ends 44 and enclosures 44A securely within couplings 61. When locked in the couplings the tip 58 of lock pin 52 is lodged in the fourth hole 68 and adapted to hold distal end 44 and enclosure 44A securely between upright plates 62 of couplings 61. Referring to FIG. 9, the second quick release lock connection comprises a push button assembly 71. The assembly consists of a channel section 72 including an upright cross web 73 connected to a pair of spaced side webs 74. The outer ends 75 of webs 74 are mounted over the fourth hole 68 on the outside plates of couplings 61. An opening 76 is located in top 73 for access to hole 68. Disposed in opening 76 is a push button pin 77 that is connected on an outer end to a push button 78. On the inner end of the pin 77 is a cylindrical knob 79 adapted to slide through hole 68 in the outside plate 69 so as to engage and dislodge lock pin 52 of first quick release lock connection out of fourth hole 68 and release distal ends 44 and enclosures 44A from couplings 61. The first and second quick release lock connections are fully disclosed in FIG. 8 and 10.

The above discussion has covered the detailed parts of the modified embodiment of the present invention shown in FIG. 3. The following elements described herein are same as those covered for FIG. 1. Accordingly, the couplings 61 of FIG. 3 are further connected at the rear ends 65 to the outer ends 128 of a pair of spaced extensions 129. The extensions slope downward and rearward to inner ends 130 which are secured to frame 131 of automotive vehicle 132.

A spare tire and wheel mounted on frame 42 of the modified apparatus of FIG. 3 is the same shown in FIG. 1. The wheel is placed with the hub holes adjacent to the openings 140 in bracket 134. Bracket 134 has two side members 135 with outer ends secured at right angle to a crest section of frame 42. A hole 137 extends through both side members 135 adjacent to the spare tire frame. A U-shaped stand 138 has a pair of spaced right angle inward formed ends 139 hanging loosely in the holes 137. The stand is adapted to swing outwardly and support the lowered frame horizontally above the ground. The lock assembly housed in the enclosure covered distal ends and push button assembly mounted on the pair of couplings operate to maintain the locked connection between the distal ends and couplings to hold the frame in an upright position. When the frame is to be lowered the push button 78 pin 77 connected to the push button has an inner end connected to a cylindrical knob 79 which is forcefully pushed into the fourth hole 68 of the couplings 61. The tip 58 of lock pin 52 disposed in hole 68 is therein dislodged from the hole 68 and forced back into body 49 installed in distal ends 44 and enclosure 44A of the frame. Subsequently, the distal ends are free to slip out of the couplings and due to the frame weight and moment arm to the hinge pin the frame is easily rotated about the first and second hinge connections 46 and 67. Connected across the legs of the U-shaped stand 138 is a strip of metal 80 for attaching a license plate thereon. Included are a pair of holes 81 for attaching the plate thereto.

I claim:

1. A spare tire and wheel holder mounted on an end of a automotive body frame in combination with rotatable mechanism for lowering the holder to a horizontal ground supported position, comprising: an arch-like frame having a pair of spaced downward and rearward extremities terminating in a left distal end and a right distal end and a crest, said crest connected to said pair of extremities, and including a first hole bored through the pair of distal ends for a first hinge connection, and a second hole bored in sequence through said pair of distal ends for a first lock connection, a pair of left coupling plates and right coupling plates having a rib members secured across a bottom edge of each pair of the coupling plates, a third hole bored through a front end of each pair of said coupling plates for a second hinge connection, a hinge pin disposed in the third and first holes for rotating the first hinge connection about the second hinge connection and a fourth hole bored through a rear end of each air of said coupling plates for a second lock connection, a fastening member adapted to operate jointly in the second and fourth holes and secure the first lock connection and the second lock connection together to support the frame upright, a left extension member and a right extension member having an upper end connection respectively to the rear ends of each of said pair of coupling plates and a lower end secured respectively to a left and right end portion of the automotive body frame, a channel-like bracket having a cross member, a pair of inner ends of a pair of side members joined to opposite ends of said cross member, disposed at a right angle to the pair of side members, and outer ends connected to spaced portions of the extremities adjacent to the crest of said arch-like frame, a pair of fifth holes each bored through the pair of outer ends of the pair of side members and the cross member including a pair of spaced mounting holes bored therein for attaching the spare tire and wheel on the bracket, an Omega-shaped stand formed with opposite right angle ends inserted in the pair of fifth holes arranged to swing downward when lowering said arch-like frame and provide horizontal ground support for removably mounting said spare tire and wheel on said channel-like bracket, and means for lowering said arch-like frame which comprises removing the fastening member from said pair of second and fourth holes so as to release the locked pair of distal end from within each of said pair of coupling plates whereby said frame can be rotated downwardly.

2. A spare tire and wheel holder as cited in claim 1, wherein:

said pair of left and right coupling plates has a top open channel and an open bottom except for the rib member which provides stop means for said pair of distal ends to rest on.

3. A spare tire and wheel holder as cited in claim 1, wherein:

said fastening member is a pin having a handle on one end and a fastener on the other.

4. A spare tire and wheel holder as cited in claim 1, wherein:

said arch-like frame is a tubular body with said extremities spaced in parallel relationship and positioned so that a side of said arch-like frame supporting the tire and wheel faces the vehicle.

5. A spare tire and wheel holder mounted on a pickup truck body frame and the like in combination with rotatable mechanism for lowering the holder to a horizontal ground supported position, comprising:

an arch-like tubular frame having an arcuate crest portion, a pair of parallel spaced extremities terminating in a left distal end and a right distal end, said crest portion connected to said pair of extremities, and a first hole bored in the pair of distal ends for a first hinge connection, and a second hole bored in sequence through said pair of distal ends for a first lock connection, a pair of left upright coupling plates and right upright coupling plates having a rib member secured across a bottom edge of each pair of the coupling plates for a stop element, a third hole bored through a front end of each of said pair of coupling plates for a second hinge connection including a hinge pin disposed in the third and second holes adapted to rotate said pair of distal ends about each of said pair of coupling plates and a pair of fourth holes bored through a rear end of each of said pair of coupling plates for a second lock connection, a lock assembly secured within said pair of extremities adapted to fasten said pair of distal ends on the rib members including an elongated spring, a lock pin having a tip portion slidably urged into each pair of the fourth holes in said pair of coupling plates by said elongated spring abutting said pair of extremities and against the tip portion of the lock pin, a channel-like push-button assembly mounted on one side of said pair of coupling plates having a push button pin slidably adapted to engage and force the top portion of the lock pin out of said fourth hole and release said pair of distal ends form said pair of coupling plates, a left coupling extension and a right coupling extension having an upper end connection respectively to the rear ends of said pair of left and right coupling plates and a lower end secured to a left and right end portion of the automotive body frame, a channel-like bracket formed of a cross member and a pair of spaced side members having inner ends joined to the opposite ends of said cross member disposed at right angles to the pair of side members, and outer ends connected horizontally to said crest portion of the arch-like frame, including a pair of fifth holes for a stand connection each bored through the outer ends of the pair of side members, and a pair of slotted mounting holes bored through the cross member for fastening the spare tire and wheel on the bracket, an Omega-shaped stand with a pair of right angle ends inserted in the pair of fifth holes adapted to swing downward upon lowering said arch-like frame and provide horizontal ground support for removably mounting said tire and wheel on said frame, and means for lowering said arch-like frame in cooperation with movement of the push button pin adapted to apply end pressure in said pair of fourth holes and dislodge said tip portion of said spring actuated lock pin, whereby said pair of distal ends rotatably balanced on the hinge pin connecting said first and second hinge connections allows said pair of distal ends to rise out of said pair of coupling plates.

6. A spare tire and wheel holder as recited in claim 5, wherein:
said arch-like frame is a metal structure, and further including a square tubular enclosure over said pair of distal ends having side holes in registry with said pair of first and second holes in said pair of parallel spaced extremities adjacent to said pair of distal ends.

7. A spare tire and wheel holder as recited in claim 6, wherein:
each pair of couplings comprise rectangular metal plates having a length and width sufficient to enclose said pair of distal ends and the square tubular enclosure therebetween.

8. A spare tire and wheel holder as recited in claim 5, wherein:
the lock assembly further includes a metal tube having a central bore for slidably containing said lock pin, a rod disposed concentrically in the bore with a front end connected to the tip portion of said lock pin, and the elongated spring enclosed around the rod adapted to push against an inner wall of said pair of extremities adjacent to said pair of distal ends and urge said tip portion into said pair of fourth holes in said pair of coupling plates, a slotted opening through a top of the metal tube including a screw slidably attached to said lock pin disposed in the opening for limiting reciprocal movement of said lock pin.

9. A spare tire and wheel holder as cited in claim 5, wherein:
the channel-like push button assembly includes an upright cross-plate having opposite ends joined to a pair of spaced said plates and a hole extending through the cross-plate for slidably receiving the push button pin having a button on an outer end and a knob on an inner end adapted to dislodge said lock pin from said fourth hole.

* * * * *